US008881305B2

(12) United States Patent
Salomone (10) Patent No.: US 8,881,305 B2
(45) Date of Patent: Nov. 4, 2014

(54) METHODS AND APPARATUS FOR MAINTAINING SECURE CONNECTIONS IN A WIRELESS COMMUNICATION NETWORK

(75) Inventor: Leonardo Jose Silva Salomone, Kanata (CA)

(73) Assignee: BlackBerry Limited, Waterloo (CA)

( * ) Notice: Subject to any disclaimer, the term of this patent is extended or adjusted under 35 U.S.C. 154(b) by 1071 days.

(21) Appl. No.: 12/501,633

(22) Filed: Jul. 13, 2009

(65) Prior Publication Data

US 2011/0010539 A1     Jan. 13, 2011

(51) Int. Cl.
| | |
|---|---|
| *H04L 29/06* | (2006.01) |
| *H04L 9/32* | (2006.01) |
| *H04W 12/04* | (2009.01) |
| *H04L 9/08* | (2006.01) |
| *H04W 88/08* | (2009.01) |
| *H04W 88/02* | (2009.01) |

(52) U.S. Cl.
CPC .............. *H04L 63/068* (2013.01); *H04L 9/321* (2013.01); *H04W 88/08* (2013.01); *H04L 9/3271* (2013.01); *H04W 12/04* (2013.01); *H04L 9/088* (2013.01); *H04W 88/02* (2013.01); *H04L 2209/80* (2013.01)
USPC ............. 726/29; 713/168; 713/169; 713/170; 713/171; 726/27; 726/28; 726/26

(58) Field of Classification Search
USPC .......................................................... 726/29
See application file for complete search history.

(56) References Cited

U.S. PATENT DOCUMENTS

| | | | |
|---|---|---|---|
| 7,477,906 | B2 | 1/2009 | Radic et al. |
| 7,865,212 | B2 | 1/2011 | Tysowski |

(Continued)

FOREIGN PATENT DOCUMENTS

| | | |
|---|---|---|
| EP | 1530321 A1 | 11/2004 |
| EP | 1530318 A1 | 5/2005 |

(Continued)

OTHER PUBLICATIONS

Frankel, Yair et al., Enhanced Security Protocols for the CDPD Network: Security Issues in a CDPD Wireless Network, IEEE Personal Communications, No. 4, pp. 16-27, New York, NY, USA, Aug. 2, 1995.

(Continued)

*Primary Examiner* — Longbit Chai
(74) *Attorney, Agent, or Firm* — Ridout & Maybee LLP (57) ABSTRACT

In one illustrative example, a method in a mobile communication device operating in a wireless local area network (WLAN) involves performing, via a wireless AP of the WLAN, a first authentication procedure with an authentication server for obtaining a first session key and a key lifetime value associated with the first session key; establishing a first secure connection with the wireless AP based on the first session key; setting a timer with an initial value that is less than or equal to the key lifetime value, and running the timer; communicating in a media session over the first secure connection with the wireless AP; and in response to an expiration of the timer during the media session: performing, during the media session, a second authentication procedure with the authentication server for obtaining a second session key; and establishing, during the media session, a second secure connection with the wireless AP using the second session key; and communicating in the media session over the second secure connection with the wireless AP. In another illustrative example, the method involves performing the second authentication procedure with the authentication server in response to identifying a request for establishing the media session, just prior to establishing the media session.

9 Claims, 5 Drawing Sheets

(56) References Cited

U.S. PATENT DOCUMENTS

| | | |
|---|---|---|
| 2003/0056050 A1 | 3/2003 | Moro |
| 2003/0221098 A1 | 11/2003 | Chen et al. |
| 2003/0226011 A1 | 12/2003 | Kuwano et al. |
| 2004/0038700 A1 | 2/2004 | Gibbs |
| 2005/0009563 A1 | 1/2005 | Stenmark |
| 2005/0094814 A1* | 5/2005 | Aihara ................ 380/247 |
| 2005/0160277 A1 | 7/2005 | Sciupac |
| 2005/0170827 A1 | 8/2005 | Nagashima |
| 2005/0177723 A1 | 8/2005 | Huang et al. |
| 2005/0223143 A1 | 10/2005 | Kang et al. |
| 2006/0094466 A1 | 5/2006 | Tran |
| 2006/0281441 A1 | 12/2006 | Okochi |
| 2006/0282553 A1 | 12/2006 | Miller et al. |
| 2007/0112967 A1* | 5/2007 | Lee et al. ................. 709/229 |
| 2007/0186096 A1 | 8/2007 | Ohba |
| 2007/0206537 A1* | 9/2007 | Cam-Winget et al. ........ 370/331 |
| 2008/0144589 A1 | 6/2008 | Buckley |
| 2008/0151868 A1 | 6/2008 | Kezys |
| 2008/0195861 A1 | 8/2008 | Salomone |
| 2009/0034736 A1 | 2/2009 | French |

FOREIGN PATENT DOCUMENTS

| | | |
|---|---|---|
| EP | 1253797 B1 | 6/2005 |
| EP | 1746797 A1 | 1/2007 |

OTHER PUBLICATIONS

Digital Cellular Telecommunications System (Phase 2+); Security Related Network Functions, GSM 3.20 Version 7.2.0 Release 1998.

European Search Report & Written Opinion for EP Application # 09165286.7 Filed Jul. 13, 2009.

* cited by examiner

METHODS AND APPARATUS FOR MAINTAINING SECURE CONNECTIONS IN A WIRELESS COMMUNICATION NETWORK

FIELD OF THE TECHNOLOGY

The present disclosure relates generally to wireless communications networks and, in particular, to network access authentication.

BACKGROUND

In conventional networks, such as wireless networks, peer devices need to be authenticated before they are permitted access to the network. A number of standards have developed to govern the authentication of peer devices and to control access to networks. For example, IEEE standard 802.11i defines certain security protocols for wireless network access and authentication, and IEEE 802.1X provides a port-based authentication framework for 802 LANs, and, in particular, wireless local area networks (WLANs) that conform to the IEEE 802.11 standard. IEEE 802.1X can be implemented using a standard authentication protocol framework, such as the Extensible Authentication Protocol (EAP) defined in RFC 3748.

EAP defines an authentication framework rather than the actual authentication method. Within EAP, there are a number of methods/mechanisms that may be employed to conduct the authentication exchange. These may be referred to as EAP-specific authentication methods or mechanisms. Examples include EAP-TLS, EAP-SIM, EAP-AKA, PEAP, LEAP and EAP-TTLS.

During an EAP-specific authentication exchange, master session keys (MSKs) are generated by the peer and the server. At the server-side, an associated key lifetime is also generated. The MSKs may be later used to derive additional keys, including transient session keys (TSKs)—also called pairwise transient keys (PTKs). These derived PTKs or TSKs will share the same key lifetime limitations of the MSKs. If the EAP authentication exchange is successful, an EAP success message is sent from the server to the peer, often via an intermediary authenticator associated with the access port.

When the PTK or TSK lifetime expires, the authenticator must de-authenticate the peer device from the network. The peer device is required to repeat the authentication process. This de-authentication, and consequent disconnection from the access point, may be highly undesirable if the peer device is engaged in an active session. For example, in voice-over-IP (VoIP) and other such communication applications, the disconnection may result in dropped phone calls. In other applications, media sessions may be disrupted and data packets may be lost as a result of the disconnection.

Accordingly, it would be advantageous to provide an improved method and system for peer device authentication.

BRIEF DESCRIPTION OF THE DRAWINGS

Embodiments will now be described by way of example with reference to the accompanying drawings, through which like reference numerals are used to indicate similar features.

DETAILED DESCRIPTION OF THE PREFERRED EMBODIMENTS

In one illustrative embodiment of the present disclosure, a method in a mobile communication device operating in a wireless communication network (e.g. a WLAN) involves performing, via a wireless AP of the WLAN, a first authentication procedure with an authentication server for obtaining a first session key and a key lifetime value associated with the first session key; establishing a first secure connection with the wireless AP based on the first session key; setting a timer with an initial value that is less than or equal to the key lifetime value, and running the timer; communicating in a media session over the first secure connection with the wireless AP; and in response to an expiration of the timer during the media session: performing, during the media session, a second authentication procedure with the authentication server for obtaining a second session key; and establishing, during the media session, a second secure connection with the wireless AP using the second session key; and communicating in the media session over the second secure connection with the wireless AP.

In another illustrative embodiment, another method in a mobile communication device operating in a wireless communication network (e.g. a WLAN) involves performing, via a wireless AP of the WLAN, a first authentication procedure with the authentication server for obtaining a first session key and a key lifetime value associated with the first session key; establishing a first secure connection with the wireless AP using the first session key; identifying a request to establish a media session; and in response to identifying the request: performing, via the wireless AP, a second authentication procedure with the authentication server for obtaining a second session key; establishing a second secure connection with the wireless AP using the second session key; and establishing communications for the media session over the second secure connection.

One illustrative network authentication system includes a peer to be authenticated onto a wireless network, an authenticator coupled to the network, and an authentication server coupled to the network. The peer and the server are configured to perform an authentication phase, the server is configured to generate a session time and communicate the session time to the authenticator, and the authenticator is configured to communicate a success message to the peer, wherein the success message includes a session timeout value including the session time. The authentication server may support Extensible Authentication Protocol (EAP), and the network may be accessible through an access point associated with the authenticator. The method may involve the steps of exchanging EAP-specific authentication messages between the peer device and the authentication server via the authenticator, generating keying material in the peer device, generating the keying material and an associated key lifetime in the authentication server, and communicating the keying material and the associated key lifetime from the authentication server to the authenticator. It may also include the steps of, communicating an EAP Success message from the authenticator to the peer device following the exchange of EAP-specific authentication messages, wherein the EAP Success message contains the associated key lifetime, and conducting a Secure Association Protocol (e.g., a 4-way handshake) to complete authentication and grant the peer device unblocked access to the network after communication of the EAP success message to the peer device.

The present techniques may be provided as a computer readable medium containing program code executable by a processor of a peer device (or computer device) to configure the peer device (or computing device) to perform any of the methods described herein.

The following description of one or more specific embodiments does not limit the implementation of the invention to any particular computer programming language, operating system, system architecture or device architecture. Although some of the example embodiments discussed below relate to wireless networks or WLANs, the present disclosure is not limited to wireless networks and applies to any network using the EAP framework for authentication of peer devices.

EAP is an authentication framework that typically runs over data link layers, for example IEEE 802.11, PPP, IKEv2 in VPNs, etc. Generally, EAP permits the use of a backend authentication server, which may implement some or all EAP-specific authentication methods, with an authenticator acting as a pass-through for some or all of the EAP-specific authentication messages. A framework for EAP is outlined in IETF Request for Comments (RFC) 3748, the contents of which are herein incorporated by reference.

Figure 1:
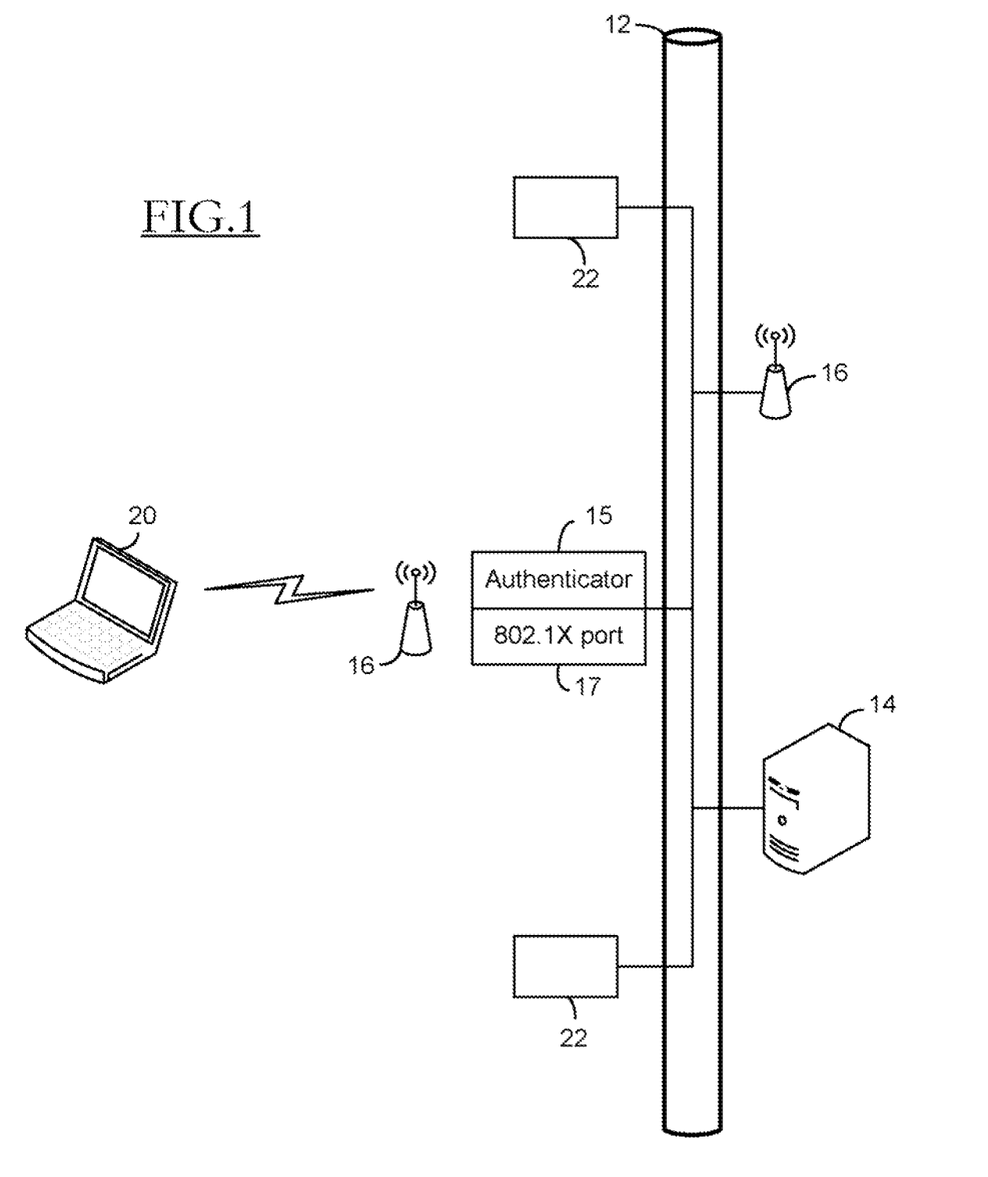
FIG. 1 shows a diagrammatic view of an example wireless local area network system to which example embodiments can be applied.

Reference is now made to FIG. 1, which shows a diagrammatic view of an example embodiment of a wireless local area network (e.g. WLAN) system 10. An Ethernet-based backbone 12 is shown having a plurality of ports for connecting of a number of devices. As shown, Ethernet 12 may have at least one access point 16. System 10 includes a peer device 20 configured for wireless communication with one of access points 16. In other embodiments, peer device 20 may be configured for wired connection and communication to one of access points 16 or other access points on Ethernet 12. In some example embodiments, at least one access point 16 may implement an IEEE 802.1X port access entity (PAE) 17, for permitting access by peer device 20 to backbone 12. Authentication server 14 is shown connected to backbone 12 and is configured to provide an authentication service for authenticating peer device 20. A number of other devices 22 may also be connected to Ethernet 12 and may be configured for communication within network system 10.

Note that peer device 20 may be any client device having one or more processors (e.g. microprocessor, microcontroller, digital signal processor or "DSP", etc.) coupled to a wireless transceiver. Peer device 20 may be or be referred to a computer terminal, a wireless mobile communication device, a personal digital assistant, or any other device configured to access Ethernet 12 via one of access points 16.

Port 17 may be switched from blocked to unblocked, either fully or partially, and vice-versa. When a device, such as peer device 20, is initially detected by access point 16, port 17 is thereby partially enabled and set to an "unauthorized" state. In this state, only 802.1X traffic will be allowed, and other traffic will be blocked, such as DHCP (Dynamic Host Configuration Protocol) and HTTP (Hypertext Transfer Protocol). If there is successful authentication of peer device 20, then port 17 becomes unblocked.

As illustrated in FIG. 1, access point 16 includes or is associated with an authenticator 15. In other example embodiments, authenticator 15 may be separate from access point 16. As will be described in greater detail below, authenticator 15 facilitates authentication of peer device 20 within network system 10. In some example embodiments, authenticator 15 acts as a pass-through between authentication server 14 and peer device 20.

Authentication server 14 may be implemented by any suitable server device, for example a controller having installed thereon suitable executable applications. For example, authentication server 14 may be configured with Remote Authentication Dial in User Service (RADIUS), as is known in the art. Generally, the RADIUS server determines whether peer device 20 is acceptable for authentication using designated or specified protocols. If accepted, the RADIUS server will then authorize access of peer device 20 to Ethernet 12 by sending an EAP success message to authenticator 15. In other example embodiments, authentication server 14 may be configured with Diameter (which may for example be used to perform a DIAM-EAP protocol), as is known in the art. Other example implementations of authentication server 14 will be appreciated by those ordinarily skilled in the art.

Figure 2:
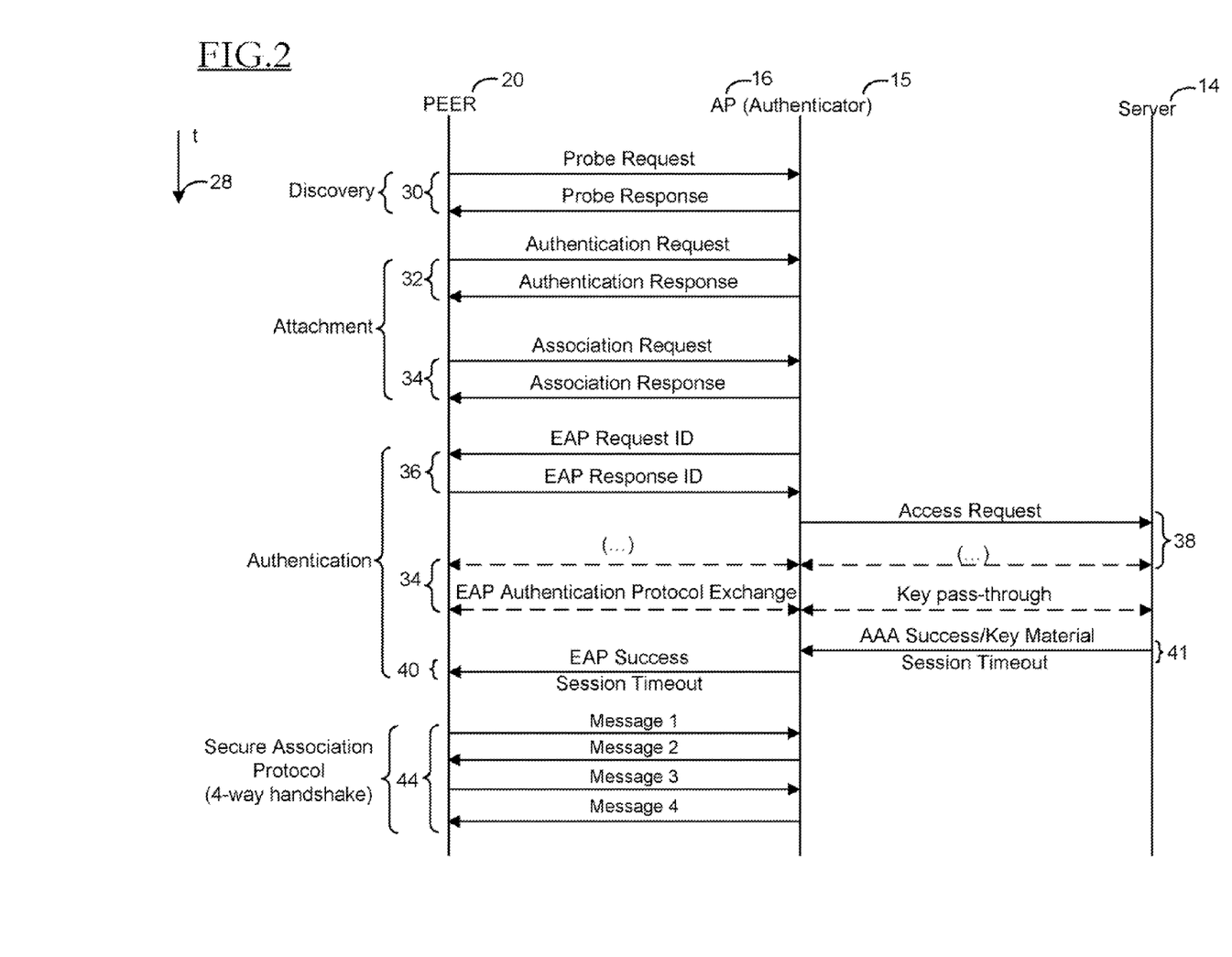
FIG. 2 shows, in diagrammatic form, an exemplary embodiment of a network authentication conversation between a peer, an authenticator, and an authentication server, as applied to the system of FIG. 1.

Reference is now made to FIG. 2, which shows an exemplary embodiment of a network authentication conversation between peer device 20, access point 16, and authentication server 14, as applied to the system of FIG. 1. Generally, a one-sided arrow denotes a unidirectional data transfer from one device to another, while a two-sided arrow denotes a bidirectional data transfer or data exchange between devices. The conversation may be performed chronologically, as indicated by a time arrow 28.

In some example embodiments, it is assumed that authenticator 15 and authentication server 14 have established a secure channel over Ethernet 12, for example using IEEE 802.1X, as is known in the art.

The conversation may include a discovery phase, an attachment phase, an authentication phase, and a secure association protocol phase, which is often referred to as a 4-way handshake. The discovery phase may include a probe request and probe response 30. The attachment phase may include an authentication request and authentication response 32, and an association request and association response 34. The authentication phase may include an EAP Request Identity and EAP Response Identity 36, an access request 38, an EAP-specific authentication exchange 40 and an AAA Success Message 41 and EAP Success Message 42. The secure association protocol phase includes a 4-way handshake 44, for example as defined in IEEE 802.11i.

The discovery phase and attachment phase may take place between peer device 20 and access point 16. The discovery phase and attachment phase is generally external to any EAP protocols. In the discovery phase, peer device 20 actively locates any access points 16 for access to the particular network associated with those access points 16. In some example embodiments, the discovery phase is performed either manually or automatically. Each step of the discovery phase and subsequent attachment phase may include a data frame, in accordance with the appropriate protocol. For some embodiments, the discovery phase and attachment phase is outlined in IEEE 802.11.

The probe request and response of step 30 is an active process by which peer device 20 actively discovers the security policy of access point 16. Peer device 20 sends a probe request to access point 16. If the probe request is acknowledged, access point 16 sends a probe response back to peer device 20. The probe request data frame may for example include service set identifier (SSID) and supported rates. The probe response data frame may for example include a timestamp, beacon interval, capability information, SSID, supported rates and security parameters.

The authentication request and response, step 32, are exchanged once probe step 30 is successful. Successful authentication permits further specified data exchange, for example, association step 34. The authentication data frame may for example include the authentication algorithm number, authentication transaction sequence number, status code, and challenge text.

The association request and response, step 34, are exchanged once authentication step 32 is successful. Successful association permits further specified data exchange such as data frames, management frames, and control frame. The association request data frame may for example include capability information, listen interval, SSID, and supported rates. The association response data frame may for example include capability information, status codes, association ID, and supported rates.

The authentication phase may be initiated on successful conclusion of the attachment phase. The authentication phase may start with EAP Request Identity and EAP Response Identity 36. This may be in the form of an EAP packet. An exemplary EAP packet format is structured as follows: code, identifier, length, and data. There may be four types of codes: 1) Request, 2) Response, 3) Success, and 4) Failure. The identifier assists in matching responses with requests. The length field indicates the length of the EAP packet. The data field may be zero or more octets, and the format may vary depending on the code field.

After successful completion of EAP Request Identity and EAP Response Identity 36, authenticator 15 sends an access request 38 to authentication server 14. In response, the authenticator initiates an EAP-specific authentication exchange 40 with peer device 20. EAP authentication exchange 40 depends on the type of EAP protocol used. The EAP authentication protocol may for example be EAP-PEAP, EAP-TLS, EAP-SIM, etc.

During the authentication phase, keying material is generated on both peer device 20 and authentication server 14. In some embodiments, the keying material is generated as a part of EAP-specified authentication exchange 40. In embodiments in which the system includes backend authentication server 14, there is a key transport step of communicating the keying material from authentication server 14 to authenticator 15 during the authentication phase. A proposed key management framework for EAP is described in IETF draft document "Extensible Authentication Protocol (EAP) Key Management Framework" (http://tools.ietf.org/id/draft-ietf-eap-keying-14.txt), Jun. 25, 2006 (hereinafter "KMF-EAP"), the contents of which is hereby incorporated by reference. As described in KMF-EAP, the keying material may include a Master Session Key (MSK), which is sometimes referred to as an AAA-Key (Authentication, Authorization and Accounting key). The MSK is derived at both peer device 20 and at authentication server 14. Authentication server 14 communicates the MSK to authenticator 15 during the authentication phase. Following the authentication phase, the MSK may be used by peer device 20 and authenticator 15 to generate further keys, including a pairwise master key (PMK) and transient session keys (TSKs).

If authentication protocol exchange 40 is successful, authentication server 14 sends an AAA success message 41 to authenticator 15 to indicate that peer device 20 has been authenticated by authentication server 14. The keying material, such as the MSK, may be sent to authenticator 15 at this time. It may be included in AAA success message 41 or sent in a separate message. Authentication server 14 may also send authenticator 15 the associated key lifetime for the keying material. In some example embodiments, the key lifetime is a default value, for example eight hours. The key lifetime may also be referred to as a session timeout value, which indicates the maximum session time before re-authentication of peer device 20 will be required.

Authenticator 15 then generates and transmits an EAP success message 42 to peer device 20. EAP success message 42 may be structured in the format of an EAP packet. Authenticator 15 also transmits the key lifetime to peer device 20. In one embodiment, the key lifetime is contained within EAP Success Message 42. For example, the key lifetime may be contained within the data field of the success packet.

Following receipt of EAP success message 42, peer device 20 is in possession of the key lifetime associated with the MSK generated at peer device 20. Peer device 20 may, therefore, accurately predict the time by which it must re-authenticate to avoid an abrupt de-authentication and possible disconnection.

Following the authentication phase, peer device 20 and authenticator 15 perform the Secure Association Protocol, which in the case of 802.11i is termed a 4-way handshake, as is known in the art. The 4-way handshake enables authenticator 15 and peer device 20 to establish secure associations with each other. Successful completion of the 4-way handshake causes IEEE 802.1X port 17 (in access point 16) to become unblocked and to permit general data traffic. The successful completion of the Secure Association Protocol further results in the generation or derivation of Transient Session Keys (TSKs) known to peer device 20 and authenticator 15.

A de-authentication step may also be performed by authenticator 15. De-authentication wholly or partially disconnects peer device 20 from system 10. IEEE 802.1X port 17 becomes blocked and no longer permits certain data exchanges with peer device 20. For example, in some embodiments, port 17 may still permit 802.1X traffic but block other traffic (such as DHCP and HTTP). De-authentication requires peer device 20 to once again perform the authentication phase (and discovery phase and attachment, if necessary). The re-authentication of peer device 20 using the above-described process, results in the generation of new keying material having a new associated key lifetime, after which peer device 20 can be granted authenticated access to network 12.

System 10 may permit pre-authentication of peer device 20. In such embodiments, peer device 20 pre-establishes the EAP keying material with an authenticator 15 prior to actually attaching to it. Thus, at a later time, 4-way handshake 44 may be performed with the key already established in order to re-establish an authenticated session. The pre-authentication is performed in a similar manner as the authentication as described above. Accordingly, in some embodiments, a difference is that there would be a delay between the re-authentication, e.g. EAP success message 42, and 4-way handshake 44.

It can be appreciated that some or all of the above steps may or may not be necessary for operation of particular embodiments of system 10. For example, the discovery phase may not be necessary when peer device 20 and access point 16 have already discovered each other.

It will also be appreciated that the transmission of the key lifetime from authenticator 15 to peer device 20 enables peer device 20 to anticipate the expiry of its session. Therefore, peer device 20 may take active steps to ensure the session does not expire in the midst of an active media session, like a VoIP call. Peer device 20 may initiate re-authentication prior to expiry of the session based on its knowledge of the key lifetime.

By incorporating the key lifetime communication into EAP Success Message 42, the present disclosure avoids having to modify every EAP-specific method so as to communicate the key lifetime during the EAP-specific authentication exchange 40. It also avoids having to communicate the key lifetime during the Secure Association Protocol, e.g. the 4-way exchange.

Alternatively, the key lifetime associated with the session key need not be communicated to peer device 20, at least not on every occasion. Peer device 20 may, for example, estimate a key lifetime based on previous sessions. For example, if a key lifetime is not communicated to peer device 20, it may estimate the key lifetime based on the longest session that has successfully occurred in the past. Here, peer device 20 may set a minimum bound (e.g. 60 minutes) to avoid any relatively high rate of reauthentication. As another example, peer device 20 may merely utilize a fixed default lifetime stored in its memory.

Figure 3:
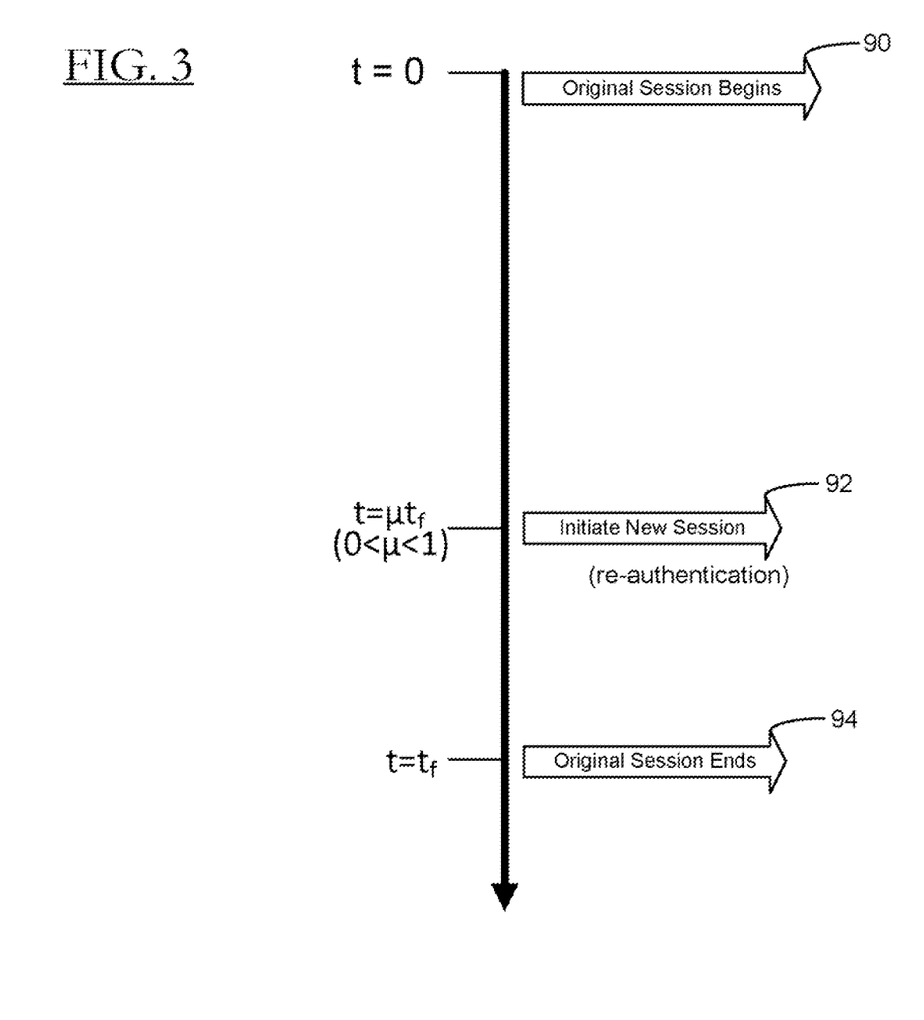
FIG. 3 shows an example timeline for initiating a new authentication session prior to expiration of an original session, as applied to the system of FIG. 1.

Reference is now made to FIG. 3, which illustrates an exemplary timeline of a network authentication session between peer device 20 and authenticator 15. An original network session 90 may be initiated, for example at time zero (t=0). Original network session 90 may for example be initiated after 4-way handshake 44 is successful and port 17 is unblocked. In some example embodiments, after the session timeout value expires (denoted by $t=t_f$), original session ends 94. At this point, authenticator 15 may perform deauthentication of peer device 20, thereby wholly or partially disconnecting peer device 20. After which, a new session must be initiated by peer device 20, for example by re-initiating the authentication phase (or the discovery phase and attachment, as appropriate).

Alternatively, referring again to FIG. 3, peer device 20 may initiate a new session 92 before original session ends 94. Since peer device 20 has a key lifetime value (as received, estimated, or default, etc.), peer device 20 may select an appropriate time before original session ends 94 at which to establish authentication for a new session 92. The time for initiating re-authentication may be selected by peer device 20 based upon a percentage of the key lifetime. The percentage may be a fixed or variable value, and is denoted as $\mu$. Thus, for example, if the key lifetime is 8 hours, an appropriate time to reinitiate authentication may be 6 hours, meaning $\mu$ would be set to 0.75. By way of example only, other suitable values for $\mu$ may range from 0.5 to 0.99. Theoretically, $\mu$ may range anywhere from 0 to 1. The re-authentication time may be set to a fixed time prior to expiry of the key lifetime, such as, for example, 30 minutes. It will be appreciated that other suitable fixed times may be used.

In one embodiment, peer device 20 may attempt to ensure that no active media sessions or services are disrupted as a result of the re-authentication process. Accordingly, peer device 20 waits to re-authenticate until peer device 20 is idle. If peer device 20 is, for example, configured for voice-over IP call applications, and a user initiates a voice-over call on peer device 20, peer device 20 may advise the user the remaining time in the existing session. Once the time for re-authentication is reached, peer device 20 may test to determine if there are any active services or sessions over the communications link. If so, then peer device 20 in this embodiment waits until the service or session ends before re-authenticating.

During the step of initiating a new session 92, peer device 20 performs re-authentication, i.e., re-establishes the EAP keying material with an authenticator 15. This may be accomplished by performing a step similar to EAP authentication protocol exchange 40, and any of the other preceding steps, where necessary. Accordingly, before original session ends 94, peer device 20 has already established the appropriate key and needs only complete 4-way handshake 44 for re-authentication.

In some example embodiments, peer device 20 may be configured to switch on or off the option of initiating new session 92 before original session ends 94. Accordingly, a user of peer device 20 may be able to set or configure the desired option.

In other embodiments, the user of peer device 20 may also set the default $\mu$ values and/or manually set the $\mu$ values at the beginning of each session. Similarly, in some example embodiments, the access point (or authenticator 15) may be configured to switch on or off the option of responding to the peer's request for a new session 92.

In yet other embodiments, peer device 20 may display a timer on a display screen (not shown), displaying or counting down the amount of time remaining in the original network session. Thus, the user of peer device 20 is continuously or intermittently informed of the remaining session time. The user may act accordingly before original session ends 94. For example, the user may choose not to start a voice-over call or not initiate any new data transfers. In some example embodiments, there may also be a manual user selectable option on peer device 20, wherein, upon selection by a user of peer device 20, a new session 92 with authenticator 15 is initiated.

Figure 4:
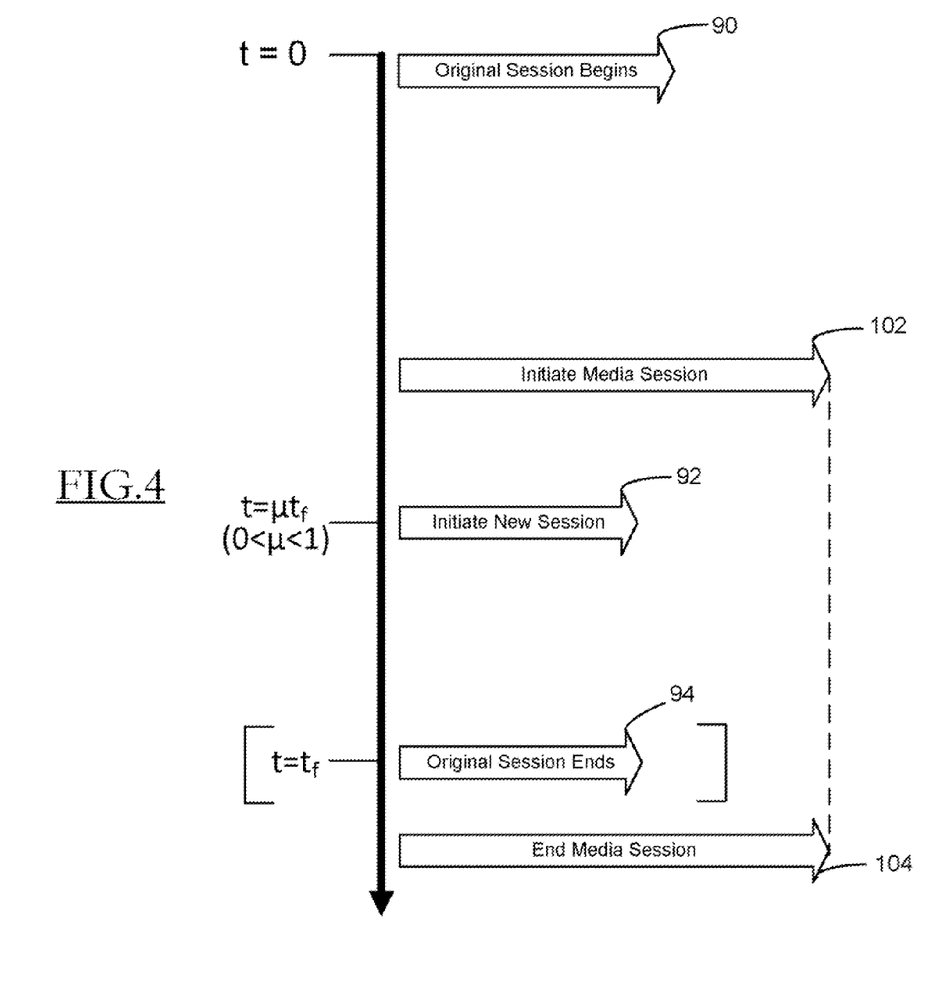
FIG. 4 shows an example timeline for initiating a new authentication session during a media session, at or prior to expiration of the original session.

FIG. 4 shows an example timeline pertaining to another method for initiating a new authentication session, at or prior to the expiration of the original session. Original session 90 may be initiated, for example, at time zero (t=0), and after 4-way handshake 44 is successful and port 17 is unblocked as previously described. As peer device 20 has a key lifetime value (as received, estimated, or default, etc.), peer device 20 selects an appropriate time before original session ends 94 at which to establish re-authentication. The time for initiating re-authentication may be selected by peer device 20 based upon the percentage of the key lifetime, as previously discussed. In one embodiment, peer device 20 sets a timer with an initial value that is less than or equal to the key lifetime, and runs the timer.

At some point in time, peer device 20 establishes a media session 102 via access point 16. Media session 102 may be, for example, a voice session or call (e.g. VoIP) with a third party, an audio or video session (e.g. streaming audio or video), etc. This media session is maintained over the secure connection with access point 16 based on the one or more session keys (MSK, PMK, TSK, or other) previously obtained. Media session 102 may be initiated or requested by peer device 20 or the third party.

During media session 102, peer device 20 identifies an expiration of the timer that was set based on the key lifetime value. In response, peer device 20 establishes new session 92 during media session 102. This technique takes advantage of the option that peer device 20 is able to maintain two or more different sessions simultaneously via access point 16.

The re-authentication of peer device 20 for new session 92 results in the generation of new keying material having a new associated key lifetime. The session keys are then updated at both peer device 20 and access point 16. Once new session 92 is established, media session 102 continues over the new secure connection with access point 16 which is based on the one or more updated session keys. Note that the keys for original session 90 are revoked, and these are no longer utilized for communication.

Note that the session keys are refreshed without forcing peer device 20 to disconnect and re-associate with access point 16. As peer device 20 is not forced to disconnect and re-associate with access point 16, the time during which peer device 20 is unable to receive or send frames (e.g. voice or other media) is substantially reduced or eliminated. This reduces the likelihood of dropping the media session. The media session 102 is maintained continuously without disruption during the processing for the new session 92. Sometime later, peer device 20 or other entity ends media session 104.

Figure 5:
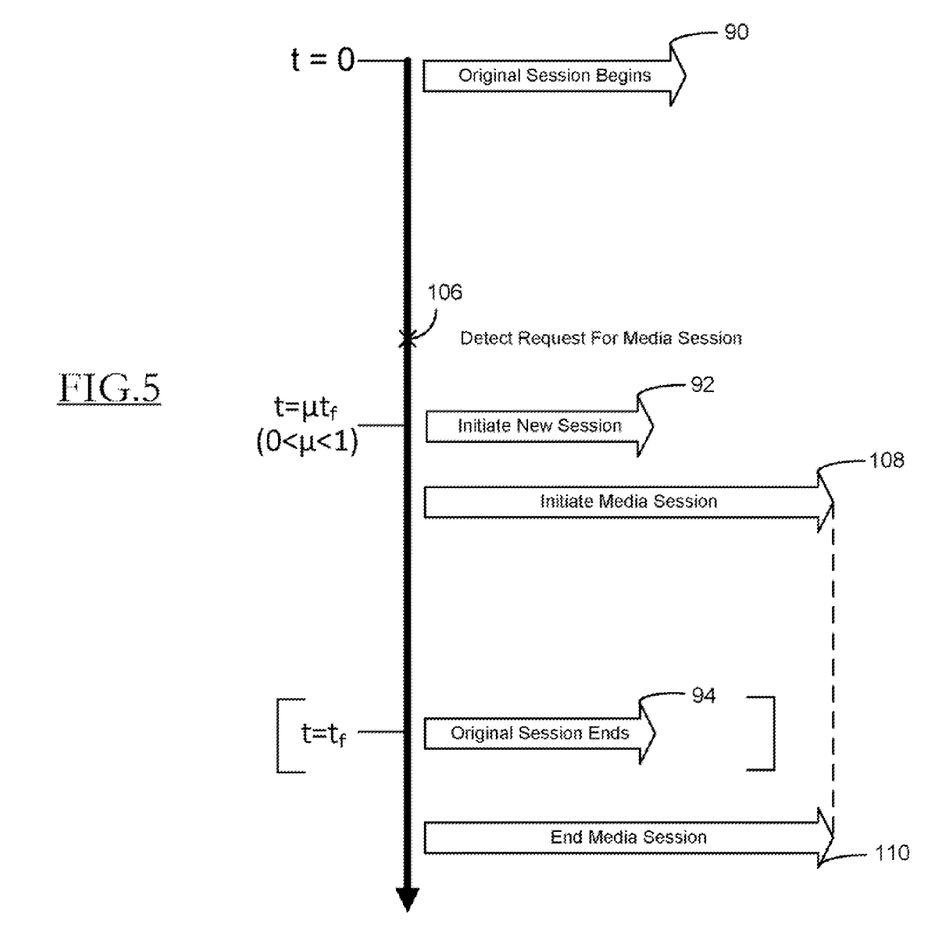
FIG. 5 shows an example timeline for initiating a new authentication session in response to identifying a request for establishing the media session.

FIG. 5 shows an example timeline pertaining to yet another method for initiating a new authentication session prior to expiration of the original session. Again, original session 90 is initiated at time zero (t=0) and after 4-way handshake 44 is successful as previously described. As peer device 20 is informed of the key lifetime value, peer device 20 selects an appropriate time before original session ends 94 at which to establish re-authentication. In one embodiment, peer device 20 sets a timer with an initial value that is less than or equal to the key lifetime, and runs the timer.

At some point in time, peer device 20 identifies a request 106 to establish a media session. Request 106 for the media session may be initiated by peer device 20 or the third party. The media session may be, for example, a voice session or call (e.g. VoIP) with a third party, an audio or video session (e.g. streaming audio or video), etc. If the media session is for a voice call, the user of peer device 20 may initiate the voice call via a user interface of peer device 20 (e.g. selecting a telephone number corresponding to the third party). In this case, peer device 20 identifies request 106 by identifying the interaction or detection via the user interface. On the other hand, peer device 20 may receive an incoming voice call from the WLAN, in which case peer device 20 identifies request 106 by identifying the incoming call message from the wireless AP.

In response to identifying request 106, peer device 20 establishes new session 92 just prior to media session 108 being established. The re-authentication of peer device 20 for new session 92 results in the generation of new keying material having a new associated key lifetime. The session keys are then updated at both peer device 20 and access point 16. After such update, and response to initial request 106, peer device 20 establishes media session 108 via access point 16. Again, media session 108 may be, for example, a voice session or call (e.g. VoIP) with a third party, an audio or video session (e.g. streaming audio or video), etc. This media session 108 is then maintained over the new secure connection with access point 16 based on the one or more updated session keys (MSK, PMK, TSK, or other). The keys for original session 90 are revoked, and these are no longer utilized for communication.

By updating the secure association just immediately prior to establishing media session 108, peer device 20 substantially reduces the chance of any disruption to take place during media session 108. This reduces the likelihood in dropping the media session. Sometime later, peer device 20 or other entity ends media session 104.

As described herein, a method in a mobile communication device operating in a wireless local area network (WLAN) involves performing, via a wireless AP of the WLAN, a first authentication procedure with an authentication server for obtaining a first session key and a key lifetime value associated with the first session key; establishing a first secure connection with the wireless AP based on the first session key; setting a timer with an initial value that is less than or equal to the key lifetime value, and running the timer; communicating in a media session over the first secure connection with the wireless AP; and in response to an expiration of the timer during the media session: performing, during the media session, a second authentication procedure with the authentication server for obtaining a second session key; and establishing, during the media session, a second secure connection with the wireless AP using the second session key; and communicating in the media session over the second secure connection with the wireless AP.

Also as described, another method in a mobile communication device operating in the WLAN involves performing, via a wireless AP of the WLAN, a first authentication procedure with the authentication server for obtaining a first session key and a key lifetime value associated with the first session key; establishing a first secure connection with the wireless AP using the first session key; identifying a request to establish a media session; and in response to identifying the request: performing, via the wireless AP, a second authentication procedure with the authentication server for obtaining a second session key; establishing a second secure connection with the wireless AP using the second session key; and establishing communications for the media session over the second secure connection.

The above description is not intended to be limited to IEEE 802.11i. Rather, example embodiments of the present invention may be applied to other network protocols, including those that use EAP. Accordingly, the system may, for example, be applied to EAP over Point-To-Point Protocol (PPP), EAP over IKEv2, and others.

While the invention has been described in detail in the foregoing specification, it will be understood by those skilled in the art that variations may be made without departing from the scope of the invention, being limited only by the appended claims.

What is claimed is:

1. A method in a mobile communication device operating in a wireless communication network, the method, comprising:

performing, via an access point of the wireless network, a first authentication procedure with an authentication server for obtaining a first session key;

establishing a secure connection with the access point using the session key;

setting a timer with an initial value that is less than or equal to a first key lifetime value associated with the first session key, and running the timer;

communicating in a media session including a voice call over the secure connection with the access point;

performing the following actions in response to an expiration of the timer during the voice call:

initiating and performing, during and without interrupting the media session that is currently executing, a second authentication procedure with the authentication server to derive a second master session key (MSK) for obtaining a second session key associated with a second key lifetime value which overlaps with the first key lifetime value;

updating, during the voice call, the mobile communication device with the second session key; and after updating, continuing the voice call over a second secure connection with the access point using the second session key;

wherein the performing of the actions are done without disconnecting from and without reassociating with the access point, so that the voice call is continuously maintained without disruption.

2. The method of claim 1, wherein the mobile device and the wireless network operate in accordance with an IEEE 802.11 standard, and the authentication procedures are based on Extended Authentication Procedure (EAP).

3. The method of claim 1, further comprising:
receiving, via the access point, the first key lifetime value from the authentication server.

4. The method of claim 1, wherein the acts of obtaining the first session key comprises deriving a master session key (MSK).

5. The method of claim 1, wherein obtaining the first session key comprises deriving a master session key (MSK) and subsequently deriving a pairwise master key (PMK) or transient session key (TSK) based on the MSK for use in the secure connection.

6. The method of claim 1, which is performed by computer instructions stored in a computer readable medium and executable by one or more processor devices of the station.

7. A mobile communication device configured to operate in a wireless communication network, the mobile communication device comprising:
one or more processor devices;
a wireless transceiver coupled to the one or more processor devices and operative to communicate with an access point of the wireless network; the one or more processor devices being operative to:
perform, via the wireless transceiver, a first authentication procedure with an authentication server for obtaining a first session key;
establish, via the wireless transceiver, a secure connection with the access point using the first session key;
set a timer with an initial value that is less than or equal to a first key lifetime value associated with the first session key, and run the timer;
communicate, via the wireless transceiver, in a media session including a voice call over the secure connection with the access point;
perform the following actions in response to an expiration of the timer during the voice call:
initiate and perform, via the wireless transceiver during and without interrupting the voice call that is currently executing, a second authentication procedure with the authentication server to derive a second master session key (MSK) for obtaining a second session key associated with a second key lifetime value which overlaps with the first key lifetime value;
update, during the voice call, the mobile communication device with the second session key; and after updating,
continue the voice call over a second secure connection with the access point using the second session key;
wherein the performing of the actions are done without disconnecting from and without reassociating with the access point, so that the voice call is continuously maintained without disruption.

8. The mobile communication device of claim 7, wherein the mobile device and the wireless network operate in accordance with an IEEE 802.11 standard, and the one or more processor devices are further operative to perform the authentication procedures based on Extended Authentication Procedure (EAP).

9. The mobile communication device of claim 7, wherein the one or more processor devices are operative to obtain the first session key by deriving a master session key (MSK) and thereafter deriving a pairwise master key (PMK) or transient session key (TSK) based on the MSK for the first secure connection.

* * * * *